United States Patent Office

2,816,286
Patented Dec. 10, 1957

2,816,286

COMBINATIONS OF RUBBERY MATERIALS AND DEHYDRATED AND HEAT TREATED RESIDUES OBTAINED IN THE FURFURAL EXTRACTIVE METHOD IN THE PURIFICATION OF BUTADIENE

Mortimer T. Harvey, South Orange, and Peter L. Rosamilia, Newark, N. J., assignors to Harvel Research Corporation, a corporation of New Jersey No Drawing. Application February 25, 1953,
Serial No. 338,876

8 Claims. (Cl. 260—5)

This invenion relates to novel compositions of matter and to methods for making the same. In one of its more specific aspects the invention is directed to improving certain characteristics of various rubbery materials by combining therewith certain materials and derivatives thereof, and includes materials which prior to our invention had been regarded commercially as waste products.

Prior to this invention, furfural and butadiene 1,3 have been reacted under varying conditions. A product of such reactions generally consisted of a dark colored, tarry mass. Such masses were varying in consistency from practically solid, semi-solid, to thick yet fluid masses. Such masses are composed essentially of complex mixtures of reaction products of furfural and butadiene in various molecular proportions, with a substantial part being in polymeric form. Before our invention, such dark colored, tarry masses were not found useful commercially and for years were regarded and treated as useless, waste products presenting a disposal problem. In the art of purification of butadiene in which the furfural extractive distillation method in the purification of butadiene is employed, said tarry masses are by-products of the process and were disposed of by burning in some instances.

Herbolsheimer in his United States Patent 2,483,903, issued on October 4, 1945, states that he produces a light colored liquid reaction product of furfural and butadiene having average molecular weight of about 210, and that the fractions thereof have boiling points in the temperature range of 200–320° F. at an absolute pressure of 1 mm. of mercury pressure and also that tarry by-products are undesirable but are formed, are separated from his liquid reaction products and are of little, if any, commercial value.

In the course of our experimentations with such waste products, we have discovered that unique and highly useful compositions of matter may be produced by combining (I) one or a combination of two or more rubbery products selected from the group consisting of natural rubber, reclaimed rubber, rubbery polymers of chloroprene known on the market as "neoprene," rubbery copolymers butadiene and styrene known on the market as "GR–S," rubbery copolymers of butadiene and acrylonitrile known on the market as "Buna N," rubbery reaction product known as "polyethylene polysulphide rubber" or "Thiokol," and rubbery polymers of butadiene which are homopolymerized butadiene in the rubbery state, and (II) reaction product of furfural and butadiene having average molecular weight of at least 330, viscosity of at least 2000 centipoises at 25° C., and melting point (ball and ring) of at least 60° F., and is soluble in furfural, the ratio by weight of (I) to (II) being about 100 parts of (I) to 3–200 parts of (II).

While various methods for producing said reaction products (II) and a number of them are now available, we shall illustrate this invention by employing herein one of them which will be sufficient to illustrate and teach the invention to those versed in the art.

There is collected and obtained a batch of what is termed the "polymeric residue formed in the furfural extractive distillation method for the purification of butadiene." (A report on such residues appears in an article entitled "Butadine-furfural copolymers," by Hillyer et al., Ind. and Eng. Chem., vol. 40, November 1948, pages 2216–2220 reference to which is hereby made.) This residue, which is a waste product, generally is combined with water and therefore the batch is first placed in an oven and maintained at elevated temperature until substantially completely dehydrated. The dehydration may be effected either at atmospheric or subatmospheric pressure and the temperature employed, of course, may vary but in factory practice we prefer that it be at least about 200° F. and in most cases in the range of 200–300° F. although higher temperatures may be employed. The resultant, dehydrated mass of said residue is a dark colored, tarry mass which may vary in consistency from substantially solid, semi-solid to fairly fluid, thick liquid depending upon the conditions of operation of the main extractive distillation units as well as the distillation units in the furfural extractive distillation method used. Said dark colored, tarry masses generally have an average molecular weight of at least 330, a melting point (ball and ring) of at least 60° F., a viscosity of at least 2000 centipoises at 25° C. and is soluble in furfural. If not, the dehydrated mass is maintained at a temperature in the range of 300–400° F. in the presence of acidic or basic catalyst which results in driving off of volatiles and quick thickening or polymerization to increase the average molecular weight, viscosity and melting point to said required minimums.

Then said mass which will now be termed product II A is ready for use or may be further processed if desired. In this particular example, product II A is thick, yet fluid and has an average molecular weight of above 330, viscosity greatly above 2000 centipoises at 25° C., melting point (ball and ring) of 75° F. and is soluble in furfural.

A portion of product II A may be heated to and maintained at a temperature in the range of 300–400° F. either at atmospheric or sub-atmospheric pressure until the viscosity thereof at 25° C. has greatly increased or until cooled at room temperature when it is in the semi-solid or substantially solid state and apparently due to polymerization and driving off of some volatiles has an average molecular weight of at least 600, a melting point (ball and ring) of at least 130° F. and is thermoplastic. Such products are hereinafter known as products II B.

Thickening of product II A may also be carried out at 300–400° F. as before to the semi-solid or solid state but in this instance in the presence of an acidic or alkaline catalyst, and for most purposes is the method which we prefer because of the higher yields, lower loss of volatiles and speed of thickening. The temperature employed in factory practice is approximately 325–350° F. and examples of acidic catalysts are diethyl sulfate, boron trifluoride, sulphuric acid, hydrochloric acid, etc. which may be added in a dilute state in a carrier to prevent local action. When dilute sulphuric or hydrochloric acid is employed, we use, for example, about .5–2 parts of each 100 parts for product II A and when diethyl sulphate is used, we use, for example, about 1–5 parts for each 100 parts of product II A. Examples of some of the cheap alkaline catalysts which may be employed are sodium hydroxide, potassium hydroxide, and calcium hydroxide, and in general 1–5 parts of said alkaline catalysts are employed for each 100 parts of product II A. Of course, it is understood that various other acidic and alkaline catalysts may be used.

The normally solid or semi-solid products produced in the presence of an acidic catalyst are known as products II C and those produced in the presence of an alkaline catalyst are known as products II D, and products II C and II D all like products II B will have average molecular weight of at least 600, are thermoplastic, are soluble in furfural and are at least about 70% soluble in acetone.

According to this invention, said (II) reaction products of butadiene and furfural having average molecular weight of at least 330, melting point (ball and ring) of at least 60° F., viscosity of at least 2000 centipoises at 25° C. and being soluble in furfural, specific examples of which products in the substantially dehydrated condition are products II A, products II B, products II C, and products II D may be combined with one or a combination of two or more of said rubbery materials (I), preferably in the proportions heretofore set forth. Such combinations may be combined with other appropriate materials employed in the compounding of the chosen rubbery stock on a mill or in a mixer and then molded, extruded or shaped in any other manner and cured according to usual procedure. The employment of such reaction products (II) with said rubbery materials (I) provides the following advantages: increases ozone resistance, imparts a plasticizing action and improves the processing properties of the rubbery materials; imparts tack to the stock; enhances resistance to petroleum solvents; acts as a reinforcing agent; acts as a softener; reduces the volume cost of finished stock. When combined with stocks of rubbery copolymers of butadiene and acrylonitrile, said reaction products (II) also serve to increase both the tensile strength and elongation when compared with control stock and at the same times decrease the durometer hardness; and when combined with stocks of rubbery polymers of chloroprene, said reaction products (II) also serve to increase its tear resistance, aid in the addition of fillers, and to reduce the milling time and consequently act as an anti-scorching agent.

While said reaction products (II) having melting points of at least 60° F. (ball and ring) may be employed in the practice of this invention, for most purposes we employ those having melting points (ball and ring) in the range of 60° F.–250° F. However, those which are far superior are those which have melting points (ball and ring) in the range of about 130–210° F., because they greatly increase ageing and also oil, tear, and ozone resistance of the rubbery material with which they are combined.

The following examples are given by way of merely illustrating various methods for preparing various types of reaction products (II), all parts throughout this entire description and claims being by weight unless otherwise specified.

*Example 1*

Into an oven maintained at 260–280° F. was placed a steel drum containing 485 lbs. of raw residue obtained as a by-product in the purification of butadiene in which the furfural extractive distillation method was employed by that company. Said residue is allowed to stand in that oven at that temperature for a period of about 15–18 hours whereupon said residue was completely dehydrated and some of the higher volatiles originally contained therein had been driven off. At the end of that period the mass in the container was weighed and found to be 412 lbs. of a dark, thick, yet fluid mass soluble in furfural, having an average molecular weight above 330, having a viscosity above 2000 centipoises at 25° C., and having a melting point (ball and ring) above 60° F. This product is hereinafter known as product II AP. If desired, said product II AP may be thickened by heating in the presence or absence of an acidic or alkaline catalyst and at atmospheric or subatmospheric pressure to thicken the same and increase its average moleculer weight and melting point (ball and ring) to values above 330 and preferably to at least 600 and above 60° F. and preferably to 130–210° F. For example, the entire 412 lb. mass may be transferred to an open kettle and heated to approximately 425° F. and maintained at that temperature for approximately 2–5 hours. Then the source of heat may be removed and the resultant mass poured into pans and allowed to cool to room temperature. At this temperature the mass will be a thermoplastic solid insoluble in hot and cold VMP naphtha and will have a melting point (ball and ring) of 178° F. consisting chiefly of a highly polymerized reaction mass weighing approximately 305 lbs. This product which may be hereinafter known as product II BP may be crushed and added in the crushed state to the rubbery materials.

*Example 2*

Into a closed vessel is charged approximately 500 lbs. of raw residue obtained as a by-product in the purification of butadiene in which the furfural extractive distillation method is employed by that company. While under a vacuum of about 28 inches of mercury, the temperature of the raw residue is elevated slowly over about a one hour period until it reaches approximately 215° F., then the source of heat is removed and the vacuum is broken. The resultant mass weighs approximately 375 lbs., is thick but pourable, has a molecular weight above 330, a viscosity above 2000 at 25° C., and is soluble in furfural and has a melting point (ball and ring) above 60° F. The material which distilled over during the course of that heat treatment under vacuum consisted mainly of water together with a small amount of light volatiles. This product, said 375 lb. mass, is hereinafter known as product II AS. If desired, while under the same degree of vacuum the mass may be further heated and maintained at a temperature of 325–350° F. whereupon more volatiles come off and the remainder is so thickened or polymerized that a sample thereof when cooled to room temperature has a melting point (ball and ring) of 130–210° F. At that stage the mass is cooled to room temperature and will be found to be a thermoplastic and substantially solid resinous mass hereinafter known as product II BS. If desired, said 375 lb. mass may be heated to elevated temperatures of approximately 300–325° F. in the presence of 1–2% of an acidic catalyst such as diethyl sulphate or an alkaline catalyst such as sodium hydroxide and maintained at that temperature for about 1–2 hours either under vacuum or at atmospheric pressure until a sample thereof when cooled has a melting point (ball and ring) of 130–210° F. At that stage, the heat is removed and the mass is cooled in pans and such products at room temperature will be in the substantially solid state and hereinafter known as products II CS and products II DS respectively.

*Example 3*

Following the procedure set forth in either Example 1 or Example 2 and employing a raw residue, there are obtained products similar to those of Examples 1 and 2.

The following examples are given merely by way of illustrating an aspect of the invention, all parts being given by weight unless otherwise defined.

*Example 4*

The following stocks were prepared on a cool mill according to the usual milling procedure and then cured for 60 minutes under pressure at 275° F.

|  | Parts by weight | | | | | |
| --- | --- | --- | --- | --- | --- | --- |
|  | A | B | C | D | E | F |
| "Hycar OR-25" (copolymer of butadiene-acrylonitrile) | 100 | 200 | 100 | 200 | 100 | 100 |
| Zinc oxide | 5 | 5 | 5 | 5 | 5 | 5 |
| Product II BP | 100 | | 100 | | 30 | |
| "S. R. F. Black" (carbon black) | | | 25 | 25 | | |
| Sulfur | 5 | 5 | 5 | 5 | 2.5 | 5 |
| Benzothiazyldisulfide | 1.5 | 1.5 | 1.5 | 1.5 | 1.5 | 1.5 |

These stocks were tested and gave the following results:

| Stock | Hardness | Tensile Strength, p. s. i. | Elongation, percent |
|---|---|---|---|
| A | 33 | 1,900 | 730 |
| B | 43 | 400 | 340 |
| C | 45 | 1,900 | 710 |
| D | 48 | 1,050 | 400 |
| E | 35 | 1,090 | 640 |
| F | 50 | 400 | 190 |

*Example 5*

The following stocks were prepared on a cool mill according to the usual milling procedure and then cured for 10 minutes under pressure at 330° F.:

| | Parts by weight | |
|---|---|---|
| | G | H |
| "GR-S" (copolymer of butadiene and styrene) | 100 | 100 |
| Product II BP | 65 | 65 |
| Zinc oxide | 5 | 5 |
| Calcium silicate | 125 | 150 |
| Trimethyl dihydroxyquinoline | 1 | 1 |
| Sulfur | 5 | 5 |
| Benzothiazyldisulfide | 1.5 | 1.5 |
| Zincdimethyldithiocarbamate | 0.2 | 0.2 |

Hardness tests of these stocks were run and showed the following:

Stock: Hardness
G _____ 83
H _____ 93

These stocks are particularly useful as shoe soles and top lift compounds.

The above formulations may be modified by also employing normally solid synthetic resins such as the polymers of vinyl esters, such as vinyl acetate, vinyl chloride, etc., and/or copolymers of said esters and/or polymers of styrene. In such cases instead of 100 parts of straight "GR-S," there may be substituted combinations made of "GR-S" and said synthetic resins in the ratio range of 90:10 to 50:50.

*Example 6*

The following stock was prepared on a cool mill according to usual procedure and then cured for 60 minutes under pressure at 275° F.:

Parts by weight
"Neoprene GN" (polymerized chloroprene) _____ 100
Zinc oxide _____ 5
Stearic acid _____ 0.5
"M. P. C. Black" (Carbon black) _____ 100
"Neozone D" (beta phenyl naphthylamine) _____ 2
Product II BP _____ 100
Sulfur _____ 2
MgO _____ 4

This stock was tested and showed the following properties:

| Hardness | Tensile Strength, p. s. i. | Elongation, percent |
|---|---|---|
| 97 | 1,650 | 100 |

*Example 7*

The following stocks were prepared on a cool mill according to the usual milling procedure and then cured for 35 minutes under pressure at 307° F.:

| | Parts by weight | |
|---|---|---|
| | J | K |
| "Neoprene GN" | 100 | 100 |
| Product II BP | 20 | 10 |
| Stearic Acid | 0.5 | 1 |
| SRF Black | 50 | |
| EPC Black | | 75 |
| Dixie Clay | | 25 |
| Phenyl-beta-naphthylamine | 2 | 2 |
| Benzothiazyl disulfide | | 0.5 |
| Partially hydrogenated furfural-ketone reaction product (hydrogenated 15-65% of carbon to carbon double bonds) | 5 | 7.5 |
| Zinc Oxide | 5 | 5 |
| Magnesium Oxide | 4 | 4 |
| Hardness, Duro A | 69 | 90 |
| Modulus at 300%, p. s. i | 1,700 | |
| Tensile Strength, p. s. i | 2,150 | 2,775 |
| Ultimate Elongation, Percent | 440 | 250 |
| Air Age, 70 hrs. at 212° F.: | | |
| Hardness, Duro A | 75 | 94 |
| Modulus at 300%, p. s. i | 2,125 | |
| Tensile Strength, p. s. i | 2,225 | 2,800 |
| Ultimate Elongation, Percent | 310 | 160 |
| Aged in A. S. T. M. Oil #1 70 hrs. at 212° F., Percent Volume Change | +3 | +2 |
| Aged in A. S. T. M. Oil #3 70 hrs. at 212° F., Percent Volume Change | +73 | +51 |

While being held under a tension of approximately 50% elongation, a 4 inch length sample of J was placed in an ozone atmosphere in order to determine the time of initial cracking. This sample of J showed no indication of checking or cracking after being in said ozone atmosphere for 2000 minutes and consequently this test was discontinued at the end of that time.

Of course the specific proportions of rubbery material (I) to reaction products (II) set forth in the specific examples may be varied within the limits heretofore set forth and in place of product II BP any of said other reaction products (II) may be used.

Various combinations of said rubbery materials and said reaction products (II) also find application in the field of friction elements such as brake linings and clutch facings. For that purpose they may be employed either or both as binders and discrete friction fortifying particles in those elements. In that field the ratio in general between the weight of asbestos to the weight of the combination is 90:10 to 60:40.

The following are specific examples for making friction elements, all parts being given by weight unless otherwise indicated, and these examples are given merely by way of illustrating the invention and not in a limiting sense.

*Example 8*

100 parts of stocks A or E of Example 1, G or H of Example 2, all after milling and before curing, or of any other stock of one or more of said rubbery materials and the reaction product (II) in the ratio range of the former to the latter being 100 to 5-200 are milled together with the various fillers and curing agents, is cut up into small particles and dispersed in 300 parts of xylol. Then the entire dispersion is charged into a dough mixer containing 200-300 parts of asbestos flock or fiber together with other material, such as 100 parts barytes, etc. if desied. The mass is mixed therein until homogeneous and is then extruded or otherwise shaped into rough elongated band or ribbon form. The wet shaped band is cut into strips of required length and the strips are dried to remove the solvent. They are then cold pressed to arcuate shape and cured at gradually increasing temperatures of 150-350° F. under pressure whereupon the combination of rubbery material and the reaction product (II) is converted to the cured state. The resultant arcuate strips are dense and homogeneous and serve as good brake linings.

Example 9

Stocks A, E, G or H in the cured state, or any of the other stocks in the cured state, may be comminuted to the finely divided state such as a fine powder or dust to serve as discrete friction particles. About 5–20 parts of said dust and 15–20 parts of a thermosetting phenol-aldehyde resin (or its equivalent) in the powder state, 30–60 parts of asbestos fiber or flock and 10–30 parts of powdered barytes are charged into a ball mill and therein intimately mixed to provide a homogeneous mixture. The mixture is cold pressed to form, then hot pressed at 300° F. for 20–30 minutes and later further curved in an oven at 375° F. to provide a dense, hard homogeneous brake lining or clutch facing in which the phenol-aldehyde or its equivalent is converted to the infusible state and serves as a binder and carries the cured stock as discrete particles throughout.

Any of said reaction products (II) may be intimately combined with (III) styrene, polystyrene and/or a normally solid polymer or copolymer of a vinyl ester; all with or without one or more of said rubbery materials (I). The vinyl esters employed, for example, may be of vinyl acetate, vinyl chloride, etc. The ratio by weight of (III) to (II) being in the range of 100 parts of (III) to 5–200 parts of (II), and in most cases heat is employed especially when (II) is solid or semi-solid.

Also any of said reaction products (II) with or without (III) and with or without (I) may be combined with (IV) partially hydrogenated furfural-ketone reaction products and acidic thickened products thereof disclosed in the U. S. patents of M. T. Harvey, 2,600,403 and 2,600,764, both issued on June 17, 1952.

It is to be understood that products II A, II B, II C, II D, II AP, II BP, II AS, II BS, II CS, II DS as well as those produced under Example 3 are specific examples of various reactions products (II) and are merely illustrative thereof. Also, all of the compositions of this invention are characterized as being intimate combinations of one or more of said reaction products (II) with said other products (I), (III) and/or (IV) to provide substantially homogeneous or uniform compositions, with one product being substantially, uniformly distributed throughout the entire mass of the other product.

All of the various compositions of this invention find use in a number of different arts, as components in friction elements such as brake linings and clutch facings, also in hose, gaskets, cable coverings, mechanical goods, protective coatings for metals, tanks, cloth, paper, wood, etc.

This application is a continuation-in-part of our co-pending applications 238,376 of July 24, 1951, now abandoned, and 211,576 filed February 17, 1951. The latter application was subsequently abandoned and re-filed as application Ser. No. 435,621 on June 9, 1954.

Since certain changes may be made in the aforesaid compositions of matter and different embodiments of the invention could be made without departing from its scope, it is intended that all matter contained in the above description shall be interpreted as illustrative and not in a limiting sense.

It is also to be understood that the following claims are intended to cover all the generic and specific features of the invention herein described and all statements of the scope of the invention which as a matter of language might be said to fall therebetween, and that they are intended to be inclusive in scope and not exclusive in that, if desired, other materials may be added to our novel composition of matter herein claimed without departing from the spirit of the invention. Particularly it is to be understood that in said claims ingredients or components recited in the singular are intended to include compatible mixtures of said ingredients wherever the sense permits.

We claim:

1. A composition of matter comprising a combination of (I) a rubbery material selected from the group consisting of rubber, reclaimed rubber, rubbery polymers of chloroprene, rubbery copolymers of butadiene and styrene, rubbery copolymers of butadiene and acrylonitrile, rubbery homopolymers of butadiene, rubbery polyethylene polysulphide and (II) a material which is substantially solid and having a softening point (ball and ring) in the temperature range of about 130–250° F. and produced by dehydrating and heating a plant residue obtained in the furfural extractive distillation method for the purification of butadiene until said material is produced, the ratio by weight of (I) to (II) being 100 parts of (I) to 3–200 parts of (II).

2. A composition of matter comprising a combination of rubbery polymer of chloroprene and (II) a material which is substantially solid and having a softening point (ball and ring) in the temperature range of about 130–250° F. and produced by dehydrating and heating a plant residue obtained in the furfural extractive distillation method for the purification of butadiene until said material is produced, the ratio by weight of said rubbery polymer of chloroprene to (II) being 100 parts of chloroprene to 3–200 parts of (II).

3. A composition of matter comprising a combination of rubbery copolymer of butadiene and styrene and (II) a material which is substantially solid and having a softening point (ball and ring) in the temperature range of about 130–250° F. and produced by dehydrating and heating a plant residue obtained in the furfural extractive distillation method for the purification of butadiene until said material is produced, the ratio by weight of said rubbery copolymer of butadiene and styrene to (II) being 100 parts of butadiene and styrene to 3–200 parts of (II).

4. A composition of matter comprising a combination of rubbery copolymer of butadiene and acrylonitrile and (II) a material which is substantially solid and having a softening point (ball and ring) in the temperature range of about 130–250° F. and produced by dehydrating and heating a plant residue obtained in the furfural extractive distillation method for the purification of butadiene until said material is produced, the ratio by weight of said rubbery copolymer of butadiene and acrylonitrile to (II) being 100 parts of butadiene and acrylonitrile to 3–200 parts of (II).

5. A composition of matter comprising a combination of rubbery polyethylene polysulphide and (II) a material which is substantially solid and having a softening point (ball and ring) in the temperature range of about 130–250° F. and produced by dehydrating and heating a plant residue obtained in the furfural extractive distillation method for the purification of butadiene until said material is produced, the ratio by weight of said rubbery polyethylene polysulphide to (II) being 100 parts of polyethylene polysulphide to 3–200 parts of (II).

6. A composition of matter comprising a combination of (I) a rubbery material selected from the group consisting of rubber, reclaimed rubber, rubbery polymers of chloroprene, rubbery copolymers of butadiene and styrene, rubbery copolymers of butadiene and acrylonitrile, rubbery homopolymers of butadiene, rubbery polyethylene polysulphide and (I) a material which is substantially solid and having a softening point (ball and ring) in the temperature range of about 130–250° F. and produced by dehydrating and heating in the presence of an acidic catalyst a plant residue obtained in the furfural extractive distillation method for the purification of butadiene until said material is produced, the ratio by weight of (I) to (II) being 100 parts of (I) to 3–200 parts of (II).

7. A composition of matter comprising a combination of (I) a rubbery material selected from the group consisting of rubber, reclaimed rubber, rubbery polymers of chloroprene, rubbery copolymers of butadiene and styrene, rubbery copolymers of butadiene and acrylonitrile, rubbery homopolymers of butadiene, rubbery polyethylene polysulphide and (II) a material which is substantially solid and having a softening point (ball and ring) in the temperature range of about 130–250° F. and produced by dehydrating and heating in the presence of a basic catalyst a plant residue obtained in the furfural extractive distillation method for the purification of butadiene until said material is produced, the ratio by weight of (I) to (II) being 100 parts of (I) to 3–200 parts of (II).

8. A friction element comprising the combination of asbestos and a cured composition of (I), a rubbery material selected from the group consisting of rubber, reclaimed rubber, rubbery polymers of chloroprene, rubbery copolymers of butadiene and styrene, rubbery copolymers of butadiene and acrylonitrile, rubbery homopolymers of butadiene, rubbery polyethylene polysulphide and (II) a material which is substantially solid and having a softening point (ball and ring) in the temperature range of about 130–250° F. and produced by dehydrating and heating a plant residue obtained in the furfural extractive distillation method for the purification of butadiene until said material is produced, the ratio by weight of (I) to (II) being 100 parts of (I) to 3–200 parts of (II).

References Cited in the file of this patent

UNITED STATES PATENTS

| | | |
|---|---|---|
| 1,933,715 | Day | Nov. 7, 1933 |
| 2,483,903 | Herbolsheimer | Oct. 4, 1949 |
| 2,683,151 | Hillyer et al. | July 6, 1954 |

OTHER REFERENCES

Hillyer et al., Ind. Eng. Chem., 40, 2216–2220, 1948.